L. P. McKINNEY.
SPARE TIRE HOLDER.
APPLICATION FILED DEC. 21, 1907.

899,126.

Patented Sept. 22, 1908.

Witnesses
Jas. A. Graham.
Grace Carss.

Inventor
Leo P. McKinney
by his Attorney
Farnum F. Dorsey

UNITED STATES PATENT OFFICE.

LEO P. McKINNEY, OF BOSTON, MASSACHUSETTS, ASSIGNOR OF ONE-HALF TO JOHN L. SNOW, OF BOSTON, MASSACHUSETTS.

SPARE-TIRE HOLDER.

No. 899,126.  Specification of Letters Patent.  Patented Sept. 22, 1908.

Application filed December 31, 1907. Serial No. 408,768.

*To all whom it may concern:*

Be it known that I, LEO P. McKINNEY, a citizen of the United States, residing at Boston, in the county of Suffolk and State of Massachusetts, have invented certain new and useful Improvements in Spare-Tire Holders, of which the following is a specification.

My invention relates to devices for carrying spare tires or tire-shoes on automobiles, and the object of the invention is to produce a spare-tire holder having improved devices both for securing the tire to the holder and for securing the holder removably to the automobile.

The invention consists in the improved spare-tire holder hereinafter described, as defined in the following claims.

Figure 1:
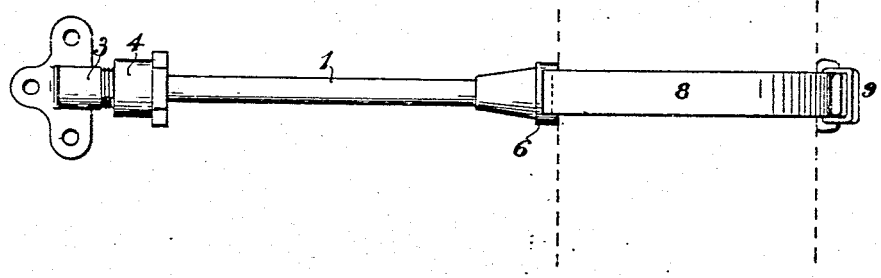
Figure 2:
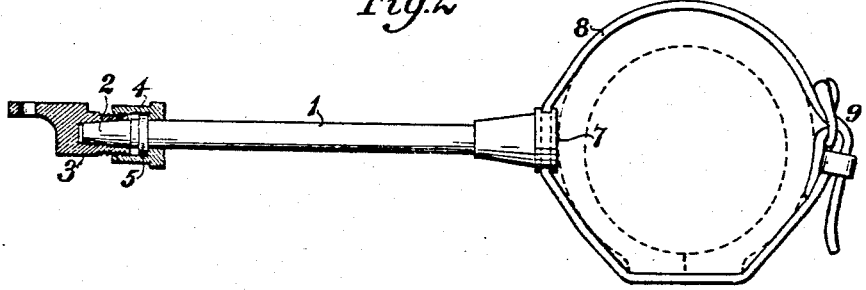

In the accompanying drawings Figure 1 is a side elevation of a device embodying the present invention, and Fig. 2 is a plan view, partly in section.

The illustrated embodiment of the invention comprises a shank 1 provided with a round tapered extremity 2 which engages a socket of corresponding form in a base member 3. A nut 4 surrounds the shank 1 and has a threaded engagement with the base member, while it also engages a collar 5 fixed to the shank, so that by tightening the nut the shank may be firmly held in engagement with the base member. When the nut is loosened, however, the shank may be turned to any position necessary to accommodate the position of the tire-engaging portion of the holder to the various conditions under which the device may be used. When the tire holder is not in use the nut may be unscrewed entirely from the base member, so that the device as a whole, with the exception of the base member, may be removed from the automobile, or as readily replaced when necessary. The tire-engaging portion comprises a head 6 on the other end of the shank. This head has a broad flat surface 7 against which the tire rests, and it is slotted transversely close to the tire-engaging surface to receive a strap 8, which passes through the slot and surrounds the tire. By using a strap of sufficient length two or more tires may be secured at once to the tire holder.

The slotted head, in combination with a strap surrounding the tire or tires has been found to be an efficient substitute for the arrangement of crotches and straps usual in devices of this character, while it affords a construction which is much lighter and neater in appearance. While the novel features relating to the means for securing the device to the automobile and the means for securing the tire are preferably used in conjunction, it will be apparent that they are not limited to such use, and that various modifications may be made in the embodiment of the invention hereinbefore described within the nature and scope of the invention as defined in the following claims.

I claim:—

1. A spare-tire holder provided with a head having a tire-engaging portion presenting a broad tire-engaging surface, and means for securing the tire against said surface comprising a strap passing directly and completely around both the tire and said tire-engaging portion.

2. A spare-tire holder provided with a head having a broad tire-engaging surface and a slot passing transversely through the head close to and substantially parallel with the tire-engaging surface, and a strap passing through the slot in the head and surrounding the tire.

3. A spare-tire holder provided with a shank, a head at one end of the shank, provided with a broad tire-engaging surface substantially concentric with and perpendicular to the shank and a transverse slot close to and substantially parallel with the tire-engaging surface, and a strap passing through the slot and surrounding the tire.

In testimony whereof, I affix my signature in presence of two witnesses.

LEO P. McKINNEY.

Witnesses:
ELLEN LOUISE BARRY,
EDWARD H. RUBY.